Jan. 27, 1953   R. V. SEAHOLM   2,626,710
SELF-CLEANING STRAINER FOR WATER AND OTHER LIQUIDS
Filed March 29, 1948   4 Sheets-Sheet 1
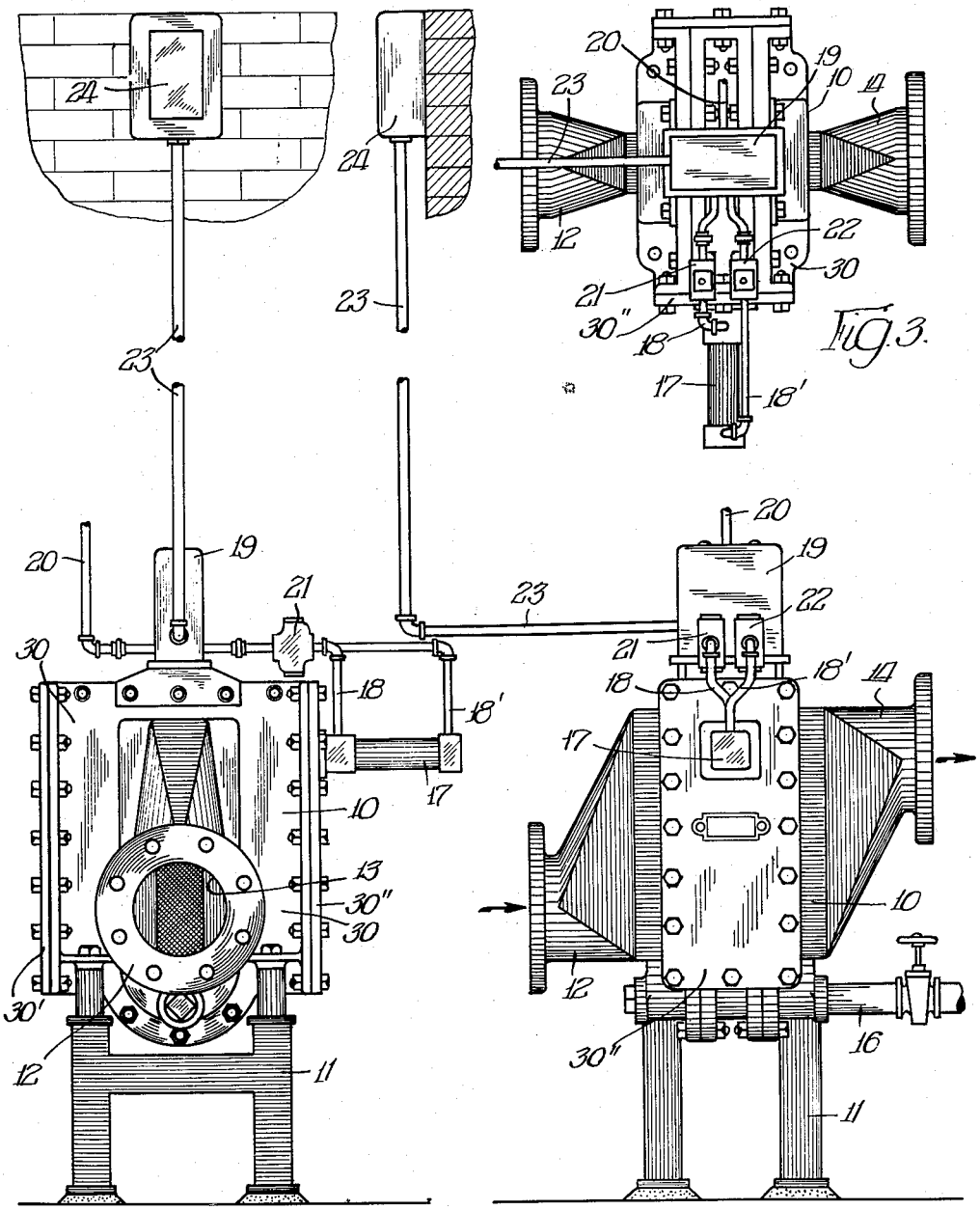
INVENTOR.
Rudolph V. Seaholm
By Cromwell, Greist & Warden
Attys.

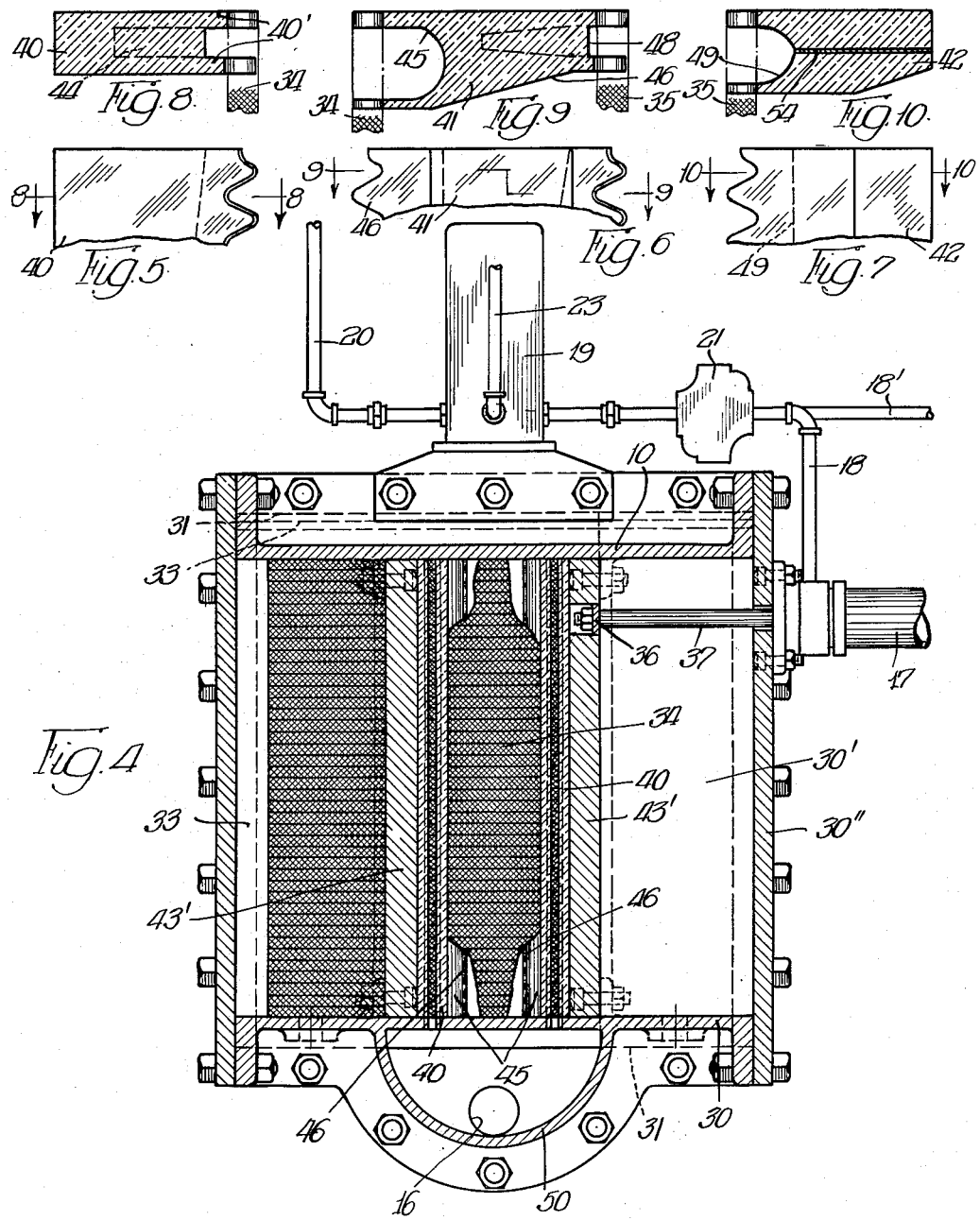

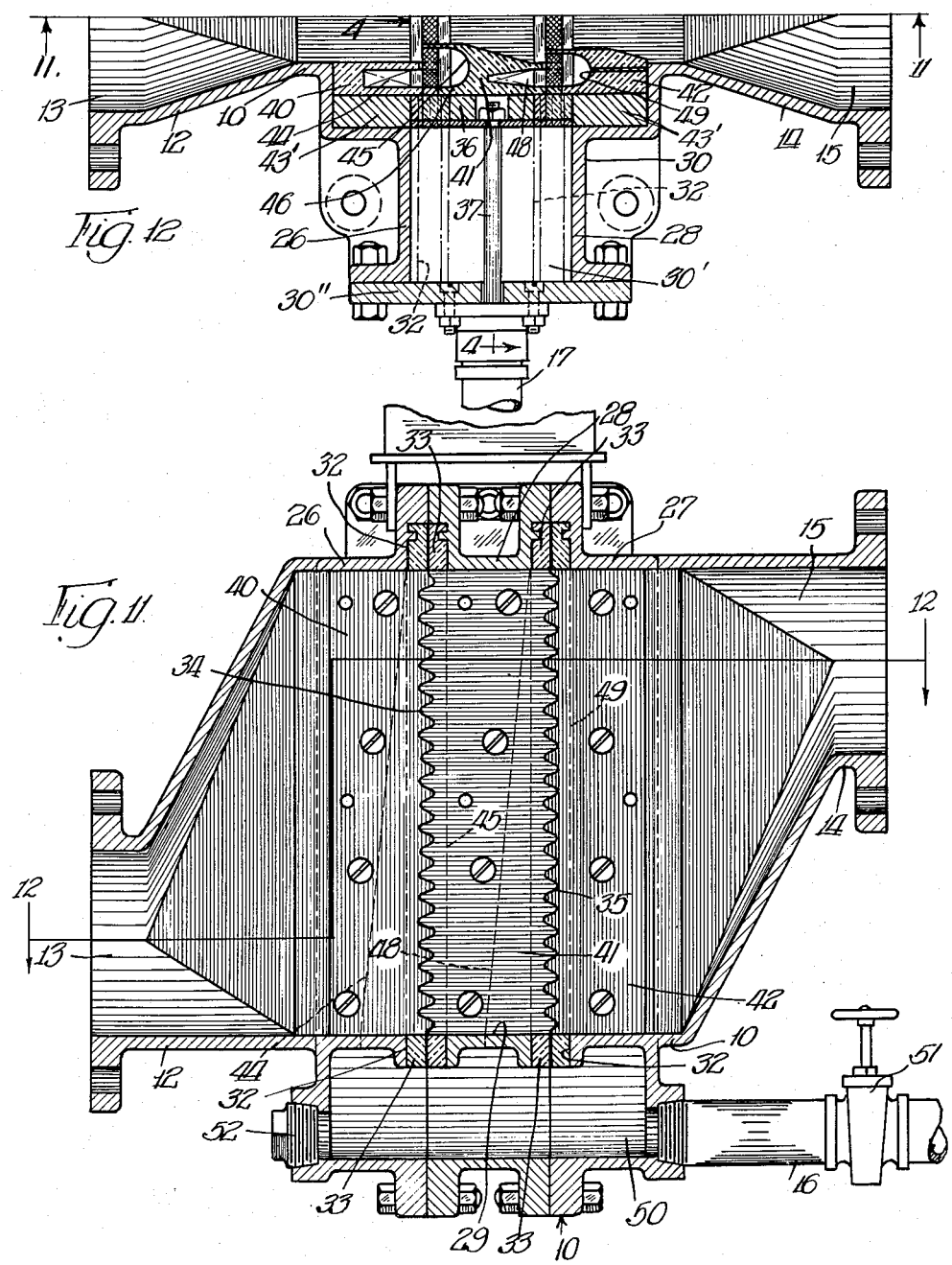

Jan. 27, 1953 R. V. SEAHOLM 2,626,710
SELF-CLEANING STRAINER FOR WATER AND OTHER LIQUIDS
Filed March 29, 1948 4 Sheets-Sheet 4
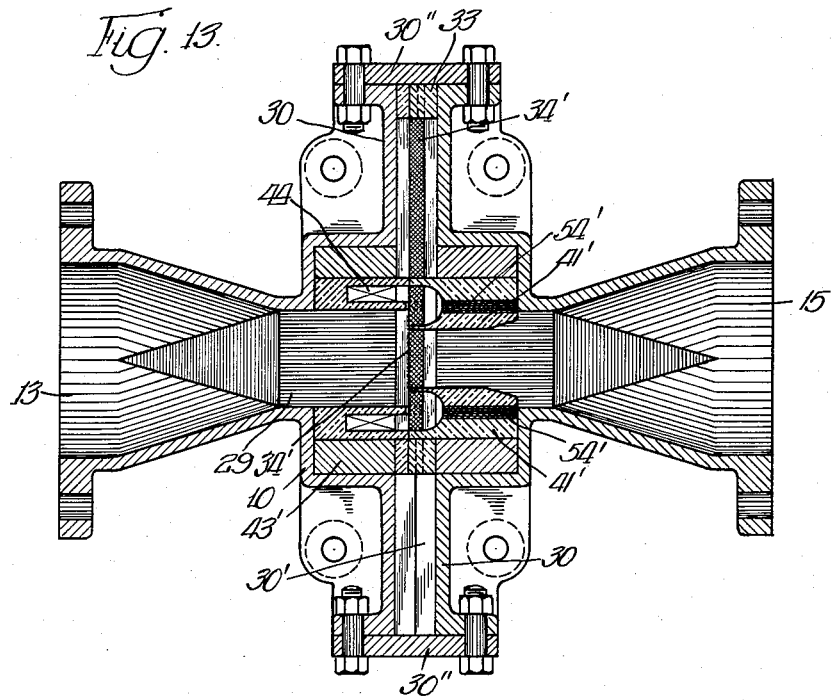
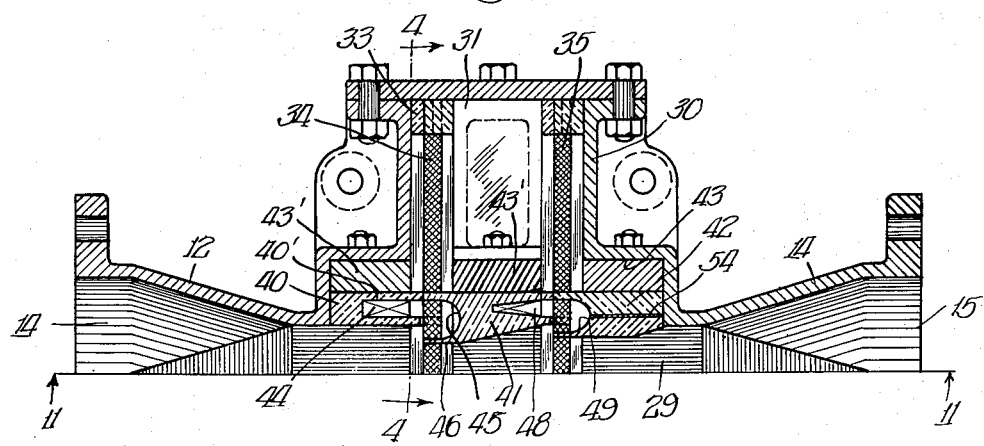
INVENTOR.
Rudolph V. Seaholm
By Cromwell, Greist & Warden
ATTYS Patented Jan. 27, 1953

2,626,710

UNITED STATES PATENT OFFICE 2,626,710

SELF-CLEANING STRAINER FOR WATER AND OTHER LIQUIDS

Rudolph V. Seaholm, Chicago, Ill.

Application March 29, 1948, Serial No. 17,755

5 Claims. (Cl. 210—167)

This invention has to do with high capacity industrial strainers of the continuous, automatic, self-cleaning type, commonly employed in manufacturing and processing plants for the purpose of removing foreign matter from water and other liquids.

The general object of the invention is to provide a new and improved strainer of the type described which is simple in construction, is inexpensive to manufacture, and will give trouble-free service.

Another object is to provide a self-cleaning strainer characterized by a novel arrangement of a reciprocating screen in such relation to improved screen backwashing means as to withdraw a minimum of liquid from the stream traversing the strainer screen in the operation of cleansing the same, and in which novel provisions are incorporated to increase the strength and ruggedness of the screen, and to provide maximum straining capacity in a space of minimum size.

A still further object is to provide a strainer of the foregoing type which is characterized by a multi-stage screening action whereby the efficiency and thoroughness of liquid purification by the strainer are considerably improved.

Yet another object is to provide a liquid strainer, particularly of multiple screen, staged type, in which the screen or screens have associated therewith backwash provisions to constantly clean the screen surface, the screen and backwash provisions being of a relatively reciprocatory type, and in which the screening surface is ribbed, corrugated or fluted in character, all to the end of providing a strainer of maximum compactness and maximum total effective screening surface for a given total cross-sectional screen area, coupled with minimum weight and minimum cost of production.

The foregoing statements are indicative in a general way of the nature of the invention, but other and more specific objects will be apparent to those skilled in the art upon a full understanding of the construction and operation of the device.

Two embodiments of the invention are presented herein for purpose of exemplification, but it will be appreciated that the invention is susceptible of incorporation in other modified forms coming equally within the scope of the appended claims.

In the drawings,

Fig. 1 is a fragmentary view in end elevation illustrating the strainer of the invention in its operative association with certain control instrumentalities;

Fig. 2 is a view in side elevation of the apparatus shown in Fig. 1;

Fig. 3 is a top plan view of the strainer and associated parts;

Fig. 4 is a fragmentary view in cross section along a line corresponding approximately to line 4—4 of Figs. 12 and 12A and being broken away in part to more clearly illustrate certain structural details;

Figs. 5, 6 and 7 are enlarged fragmentary views in side elevation, illustrating details of the plate-like screen guide and backwash elements coacting with the reciprocatory screens of the strainer;

Figs. 8, 9 and 10 are, respectively, fragmentary views in section along lines corresponding to lines 8—8 of Fig. 5, 9—9 of Fig. 6 and 10—10 of Fig. 7;

Fig. 11 is a view in longitudinal vertical section through the strainer on a line corresponding generally to line 11—11 of Figs. 12 and 12A;

Figs 12 and 12A are complementary views in longitudinal horizontal section through the strainer on lines corresponding to section line 12—12 of Fig. 11, further illustrating structural details of the backwashing provisions and their relationship of other parts of the strainer; and Fig. 13 is a view in longitudinal horizontal section, generally similar to Figs. 12 and 12A, illustrating a modified, single-stage embodiment of the invention.

Referring particularly to Figs. 1, 2 and 3 of the drawings, the reference numeral 10 generally designates the casing or housing of the present strainer, which is shown as made up of a number of castings or forgings bolted together, in a manner hereinafter referred to. It is firmly mounted upon an appropriate standard 11. This housing has a flanged intake fitting 12 on one end thereof, in a lowered position with reference to the longitudinal axis of the housing, said fitting providing an intake passage 13 (see Figs. 11–13) which is adapted to be connected to the supply of raw water or other liquid to be treated. Such liquid is forwarded to the strainer under a suitable head by a pump or other provision. The present apparatus is well adapted for the handling and treatment of liquids other than water; however, for the sake of simplicity, reference will hereinafter be made, in the description of the strainer structure and its operation, solely to its application in treating raw or industrial process water by removing suspended particles therefrom.

A discharge outlet fitting 14 on the side of housing 10 opposite the intake fitting, and elevated somewhat above the housing axis, provides a discharge passage, designated 15 in Figs. 11 to 13 inclusive, through which the purified water is discharged from the strainer to any desired destination. A valve controlled backwash discharge line 16 communicates with the bottom of housing 10, through which line the backwash water and sediment, impurities and other waste matter deposited in operation on the screening means of the strainer, and removed therefrom by the backwash, are discharged to a waste point.

The automatic operation of the strainer is controlled by certain instrumentalities of a conventional and well understood type, which are illustrated in Figs. 1 to 3 inclusive. Accordingly, specific internal operating details thereof will not be described in detail. They include a horizontal hydraulic cylinder 17 appropriately affixed to the side of housing 10 at a right angle to the vertical plane through the aligned fittings 12, 14. This cylinder has hydraulic pressure lines 18, 18' connected to opposite ends thereof for reversing the stroke of a plunger (not shown) in the cylinder. A reversing valve 19 controls the flow of pressure liquid in lines 18, 18', said liquid being supplied to valve 19 through a pipe 20 connected to a suitable pressure source.

Pressure regulator valves 21, 22 are interposed in the respective hydraulic reversing lines 18, 18' between valve 19 and the cylinder 17 to control the speed of stroke of the hydraulic plunger in cylinder 17 by regulation of the hydraulic pressure. A control conduit 23 connects the aforesaid reversing valve 19 with a suitable automatic timing instrumentality 24, electrical or otherwise, which is pre-adjusted to regulate the length of stroke of said hydraulic plunger by control of the operation of the reversing valve. The structure and functioning of all these devices are well understood in the art.

Structural details and the relationship of parts of a preferred, two-stage strainer according to the invention are illustrated in Figs. 4 through 12A, to which attention is now directed. With particular attention to Fig. 11, it will be noted that the housing 10 is made up of three sections in side by side, bolted arrangement, namely the two opposite flanged end sections 26, 27 and an intermediate annular flanged section 28 interposed therebetween. These sections are bolted together at their flanges and, in conjunction with the lateral backwash plates to be described, define an internal, vertically elongated and laterally restricted throat or duct 29 of substantial cross-sectional area to which the intake and discharge passages 13, 15 converge (see Figs. 12 and 12A). The sections 26, 27 and 28 are extended laterally at 30 on either side of housing 10, the intermediate section 27 incorporating a flow-preventing filler 31 at one side, and said sections are shaped to provide sets of upper and lower, horizontally extending screen guideways 32, as illustrated in Fig. 11. The rigid rectangular frames 33 of the primary and secondary screens 34, 35 are guided for reciprocation across duct 29 by these ways. As illustrated in Fig. 12, said screens are mechanically coupled at one side thereof in rigid, parallel relation to one another by means of a cross head 36. This cross head reciprocates in a space 30' between the lateral extensions 30 of housing sections 26, 27, on one side of the housing. Cross head 36 is affixed to an actuating rod 37. Said rod extends outwardly of housing 10 through an opening in a side closure plate 30'' applied to the housing extension 30 and is connected to a hydraulic plunger in the hydraulic reversing cylinder 17. The speed and timing of the plunger stroke, as controlled by devices 19 and 21, are such that the screens are reciprocated at a rate of about one foot per minute and traverse on each stroke the full distance between the opposite housing side plates 30''.

In order to stiffen and rigidify the screens, they are vertically ribbed or corrugated, the corrugations extending horizontally and longitudinally of the direction of reciprocation of the screens. This ribbing, in addition to its rigidifying action, has the further very important function of presenting a maximum effective screening surface in a minimum over-all width and height of screen, i. e., in a given transverse space across duct 29. The primary screen 34 is selected of a desired fineness of mesh or foramination, in accordance with the requirements of the installation in question, and the secondary screen of increased fineness. Thus a two-stage, dual screening of the liquid is performed by a single apparatus, resulting in removal of all suspended matter present in the raw water. Each stage has its own backwashing provisions to maintain the screens continuously in a condition for highest efficiency.

Liquid intercepting and backwashing members are mounted in the housing 10 at either opposite vertical side of the throat 29 therethrough for the purpose of intercepting a small portion of the liquid traversing screens 34, 35 and continually backwashing the latter with clean screened water throughout their area, as they are reciprocated in the manner just described. These members also exert a grinding action on the screen mesh to prevent deflection or displacement of the screens under pressure. They also laterally confine the flow of backwash water. In view of the corrugation of the screens referred to above, the edges of these backwash members which coact with the respective reciprocating screens are of necessity similarly corrugated. However, it is possible that in another aspect of the invention the feature of ribbing or corrugating the screens and backwash members may be considered secondary, or even eliminated. The screen backwashing features are best illustrated in Figs. 4, 12 and 12A, in their relation to the housing and screens, with further reference being had to Figs. 5 through 10 for certain details.

As clearly shown in Figs. 12 and 12A, a set of intercepting and backwash members (and there is a set on each side of the throat 29 of the housing) includes the vertically elongated, shaped plates 40, 41 and 42 which define the opposite sides of said throat. Said plates are mounted in opposed recesses 43 of the lateral housing extensions 30, to one side of the filler or backing plates 43'. The forward, waste discharge plate 40 is located on the upstream side of the primary screen 34 and is provided with a downwardly extending groove or slot 44 in one side thereof which constitutes a vertical waste duct opening toward said screen. This duct tapers downwardly and inwardly or forwardly of the plate for adequate discharge capacity, as shown in Fig. 11. The flanges 40' of the plate 40 on either side of this duct are vertically corrugated in accordance with the corrugated cross section of the screen 34 (see Figs. 5 and 8) and are spaced somewhat forwardly from said screen for non-scraping clearance in operation.

The middle plate 41 serves as a flow reversing and backwashing member for primary screen 34 and also as a waste member for secondary screen 35. It is located between the screens 34, 35 and is also corrugated on its opposite vertical edges for a nesting relation to the corrugations of said screens (see Figs. 6 and 9). This plate is provided with a vertically extending recess or slot 45 of curved sectional shape on its forward edge, i. e., facing the rear of screen 34, which slot is defined at one side by a lateral, forwardly projecting flange or lip 46. Lip 46 is positioned laterally inwardly of the inner side of plate 40 and extends into the duct 29, in a manner to scoop up a small portion of the water which has passed under pressure through a small vertical segment of screen 34 as the screen is reciprocated across said lip. Recess 45 then reverses the direction of flow of and backwashes this initially screened water through an adjoining segment or section of the screen 34, whence it discharges into the waste duct 44.

Rearwardly of recess 45 the plate 41 tapers laterally outwardly at 46 toward the secondary screen 35, for coaction with the third plate 42 in a similar backwashing of that screen. To this end, the rear edge of intermediate plate 41 is shaped, like plate 40, to provide a downwardly and forwardly tapered waste slot or duct 48 exposed rearwardly to the upstream side of screen 35. The third plate 42 is shaped to provide a vertical, flow reversing recess 49 of curved cross section, similar to the recess 45 of plate 41, and similarly coacting with the downstream side of the secondary screen 35 to thoroughly backwash the latter with twice-screened water.

The waste ducts 44 and 48 both communicate at their lower ends with a waste discharge manifold 50 in the housing-defining sections 26, 27, 28, from which waste, sediment or dirt laden backwash water is discharged through the pipe 16. Said waste pipe may be controlled by a manual valve 51. The manifold 50 is preferably provided with a clean-out opening normally closed by a plug 52.

Referring to Figs. 12 and 12A, it will be noted that simple provision is made for variably controlling the total amount of water intercepted and backwashed by making the secondary backwash plate 42, or, if desired, both plates 41 and 42, of two-part construction and clamping an optional number of spacing shims 54 between the parts thereof. However, in any desired backwashing capacity, the present strainer is notable for the small amount of water which it withdraws for waste purposes from the main stream traversing throat or duct 29. Moreover, the strainer is substantially simpler and more economical of construction and operation than existing types, while performing with increased thoroughness and efficiency by reason of its dual, staged screening action. Its ruggedness, arising in part from the ribbing of the screening members, is another notable feature.

A modification of the invention, representing primarily a simplification of the above described structure, is illustrated in Fig. 13. In this form, only a single screen, corrugated for capacity coupled with compactness, as well as strength and rigidity, is employed and, since it performs the same function as the primary screen 34 of the preferred embodiment, is designated by the reference numeral 34'. Other parts are in general identified by the same reference numerals employed in connection with the first embodiment, since practically all their structural details and their relationships to the screen 34' and the housing 10 are identical with the arrangement in the first described form. It should be noted that in this modification a substantial number of standard spacing shims 54' are employed between the parts of the composite backwash plate 41', since in the single screening operation it is desirable to have a more intense backwashing action than in the staged arrangement.

The improved strainer in either of the adaptations described above is notable, aside from the effectiveness of the self-cleaning screening which it performs, for the extreme compactness, lightness in weight, and ruggedness of its construction. The principle of relatively reciprocable screening and backwashing provisions, coupled with multiple staging of screening and backwashing units, affords a strainer of minimum size and bulk. Ribbing, corrugating or fluting of the screens not only contributes to rigidity and ruggedness, but it also multiplies the effective screening surface represented by a given cross-sectional height and width of over-all screen area. The strainer as a whole has substantially greater capacity for its size, due to its multistage, reciprocable, ribbed screen characteristic, than any other strainer, rotary, reciprocable or otherwise, of which I am aware.

I claim:

1. A straining apparatus comprising a housing having intake and discharge passages and a wall extending longitudinally therebetween and defining a path of fluid flow from said intake passage to said discharge passage, a screen of wire mesh construction having a screening surface of substantial area, said screen being disposed in said housing to extend transversely of said wall and of said path of flow, said screening surface being at all times disposed to intercept fluid flow and being ribbed throughout to provide corrugations of substantial depth projecting longitudinally in the general direction of said wall and of said path of fluid flow, a backwash device associated with said screen adjacent and directly at one side of said screening surface, and means to produce relative reciprocatory movement of said screen and associated backwash device in the direction in which said screen extends and normal to said path of fluid flow.

2. A straining apparatus in accordance with claim 1, in which said backwash device is provided with a portion immediately adjacent said screening surface which is corrugated in shape in conformance with the outline of said screen corrugations, said portion and surface being disposed in a nested relationship of the respective corrugations thereof.

3. A straining apparatus in accordance with claim 1, in which said corrugations extend in the direction of said relative reciprocatory movement.

4. A straining apparatus in accordance with claim 1, in which a second backwash device is associated with said screen adjacent and directly at the side of said screening surface opposite said first backwash device.

5. A straining apparatus in accordance with claim 1, in which said means to produce relative reciprocatory movement comprises a hydraulic plunger operatively connected to said screen, and means to reciprocate said plunger transversely of said housing wall and of said path of fluid flow.

RUDOLPH V. SEAHOLM.

(References on following page)

REFERENCES CITED

The following references are of record in the file of this patent:

UNITED STATES PATENTS

| Number | Name | Date |
|---|---|---|
| 1,508,041 | Winton | Sept. 9, 1924 |
| 1,585,817 | Bailey | May 25, 1926 |
| 1,671,487 | Quiroz et al. | May 29, 1928 |
| 1,977,601 | Winton | Oct. 16, 1934 |
| 1,993,603 | Haliburton | Mar. 5, 1935 |
| 2,077,589 | Seaver et al. | Apr. 20, 1937 |
| 2,206,348 | Dunbar | July 2, 1940 |
| 2,252,890 | Hedberg | Aug. 19, 1941 |
| 2,253,692 | De Grave | Aug. 26, 1941 |
| 2,310,587 | Mac Neill | Feb. 9, 1943 |
| 2,311,813 | Beck et al. | Feb. 23, 1943 |
| 2,429,417 | Magill | Oct. 21, 1947 |

FOREIGN PATENTS

| Number | Country | Date |
|---|---|---|
| 5,796 | Great Britain | Oct. 18, 1915 |